United States Patent [19]

Williamson

[11] 4,358,072
[45] Nov. 9, 1982

[54] LAND VEHICLE AND AIRCRAFT COMBINATION

[76] Inventor: Roger Williamson, 2862 S. 2nd East, Apt. 62, Salt Lake City, Utah 84115

[21] Appl. No.: 138,320

[22] Filed: Apr. 8, 1980

[51] Int. Cl.³ .............................................. B64C 39/00
[52] U.S. Cl. ........................................ 244/2; 244/120; 244/234
[58] Field of Search ................... 244/2, 120, 140, 224, 244/234; 180/198

[56] References Cited

U.S. PATENT DOCUMENTS

| | | | |
|---|---|---|---|
| 2,014,769 | 9/1935 | Kossakowski | 180/198 |
| 2,410,234 | 10/1946 | Read et al. | 244/2 |
| 2,462,462 | 2/1949 | Boggs et al. | 244/2 |
| 2,535,164 | 12/1950 | Seibel | 244/120 |
| 2,650,049 | 8/1953 | Fowler | 244/2 |
| 3,833,190 | 9/1974 | Gaio | 244/224 |
| 4,143,841 | 3/1979 | Roeder | 244/140 |

FOREIGN PATENT DOCUMENTS 994341  11/1951  France .................................... 244/2

Primary Examiner—Galen L. Barefoot
Attorney, Agent, or Firm—Trask & Britt

[57] ABSTRACT

A combination road and air vehicle having separate engines for each craft is disclosed. The aircraft has an air frame with wings and tail elements attached to a fuselage with a tricycle landing gear attached to the air frame. A nose platform extends forward from the bottom of the fuselage. The platform is adapted to receive and support a small land vehicle. The aircraft controls are mounted on a folding stalk attached to the top side of the platform. The land vehicle has a central opening in its body through which the control stalk may be elevated to a vertical position. The aircraft and land vehicle each have its own power plant and control system.

13 Claims, 9 Drawing Figures ary unique aspect of this invention; it supports the land vehicle, contributes to the aerodynamic design, and facilitates the employment of either single or twin engine power plants.

LAND VEHICLE AND AIRCRAFT COMBINATION

BACKGROUND OF THE INVENTION

1. Field

This invention relates to a land vehicle and aircraft combination.

2. Prior Art

Numerous designs for combination land and air vehicles have been devised. A typical design is disclosed in U.S. Pat. Nos. 2,430,869 and 2,532,195 to Fulton in which an air frame is attached to the rear of a vehicle. A single engine is shared to power the aircraft and the land vehicle. The combination craft of Fulton has numerous critical connections between the land vehicle and the aircraft to operate in-flight control of the aircraft. The plane wheels serve also as the car wheels and must be steerable and drivable. The land vehicle is suspended from the aircraft, which would dictate reinforcement of the roof and roof supports of the land vehicle. The propeller requires detachment before the land vehicle can be readily used.

A combined aircraft and automobile design is further disclosed in several patents to Hall, such as U.S. Pat. Nos. 2,562,491; 2,562,492; 2,619,301; and 2,619,184 in which the aircraft has a separate engine from the land vehicle and attaches to the top of the vehicle. The wheels of the vehicle are used for landing gear of the aircraft. A similar design is disclosed in Nye et al, U.S. Pat. No. 2,593,785.

Other patents disclosing various combination aircraft land vehicle assemblies include: U.S. Pat. Nos. 2,767,939; 2,626,530; 3,645,474; Re. 25,368; 2,215,003; 2,713,465; 2,573,271; 2,770,427; 2,430,869; 3,017,137; 3,371,886; 2,410,234; 4,173,321; 4,171,784; 4,165,846.

OBJECTS OF THE INVENTION

It is an object of the instant invention to provide a land vehicle-aircraft combination having a minimum of shared components.

It is a further object of the instant invention to provide a land vehicle-aircraft combination having suitable balance for safe flight.

Another object of the instant invention is to provide a land vehicle-aircraft combination having excellent aerodynamic characteristics.

A further object of the instant invention is to provide a land vehicle-aircraft combination having maximum in-flight reliability.

Another object of the instant invention is to provide a land vehicle-aircraft combination wherein separation and rejoining of the land vehicle and aircraft involves a minimum of time and effort.

SUMMARY OF THE INVENTION

An improved combination road and air vehicle has been invented. The road and air vehicle combination, identified herein as an acronym "RAAV" has an air frame, including fuselage, tail elements and preferably low wings. In one preferred mode, twin engines are attached to the wings. The engines are forward mounted. A single engine pusher-type system with a propeller attached to the tail of the fuselage is also an operable construction. The RAAV has a tricycle landing gear attached to the air frame with the nose wheel attached by a folding strut to the underside of a nose platform. The nose platform extends forward from the bottom of the fuselage and is adapted to receive and support a small land vehicle.

The land vehicle has contours which mate with the aircraft to form a RAAV which has excellent airflow characteristics and which, from even a careful inspection, has the appearance of a conventional aircraft.

The aircraft controls, except for rudder controls, are on a folding stalk attached to the top side of the nose platform. The land vehicle has an opening in its undercarriage which is sized and located to fit over the control stalk in its folded position whenever the land vehicle is locked to the nose platform. The control stalk may be elevated to a vertical position and locked to the dash of the land vehicle. The rudder controls are conventional foot pedals, which are raised through openings in the floorboards by the raising of the control stalk. The land vehicle and aircraft in a preferred mode do not share any control system. For a twin engine RAAV, the land vehicle preferably has its own engine located at its rear to provide proper balance.

Figure 1:
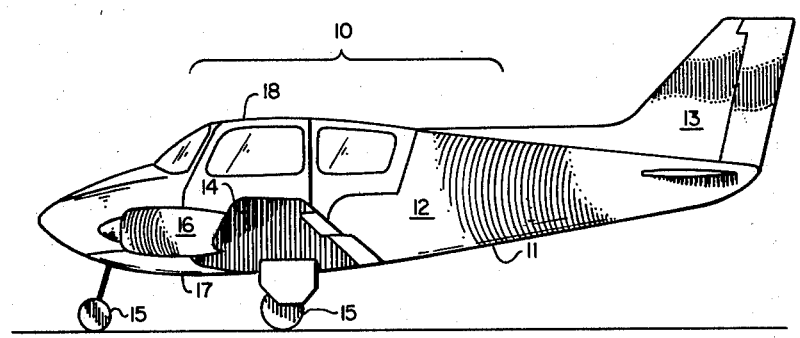
FIG. 1 is an elevational view of a land vehicle-aircraft combination.

Further description of the invention may be facilitated by reference to the attached drawings. FIG. 1 is an elevational view of the RAAV of the instant invention. The RAAV 10 is composed of an aircraft 11 consisting of a fuselage 12 and vertical stabilizer 13, low wings 14, tricycle landing gear 15 and forward twin engines 16. A nose platform 17 supports a land vehicle 18 which forms the cockpit of the RAAV. The nose platform is a particularly unique aspect of this invention; it supports the land vehicle, contributes to the aerodynamic design, and facilitates the employment of either single or twin engine power plants.

Figure 2:
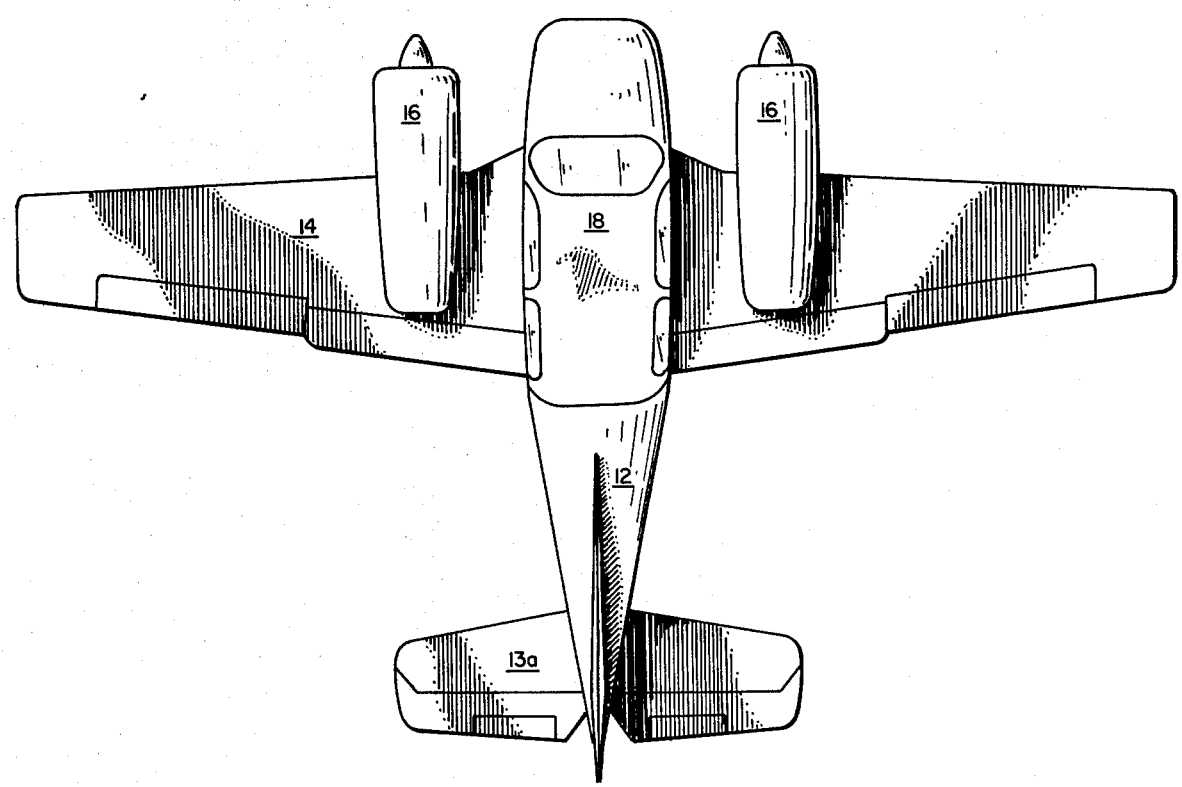
FIG. 2 is a plan view of the land vehicle-aircraft combination of FIG. 1.

Another view of the RAAV is illustrated in FIG. 2 which is an overhead plan view of the RAAV of FIG. 1. The compatibility of the lines of the land vehicle 18 and the fuselage 12 of the aircraft is readily discernible in FIG. 2. It is further noted that the rear of the land vehicle 18 is approximately aligned with the trailing edge of the wings where attached to the fuselage. The horizontal stabilizers 13a and vertical stabilizer 13, as well as the wings 14, are of a relatively conventional design for a low-wing, two engine light plane. The RAAV is designed to carry at least two passengers and up to about five passengers depending upon the size of the aircraft and engine size.

Figure 3:
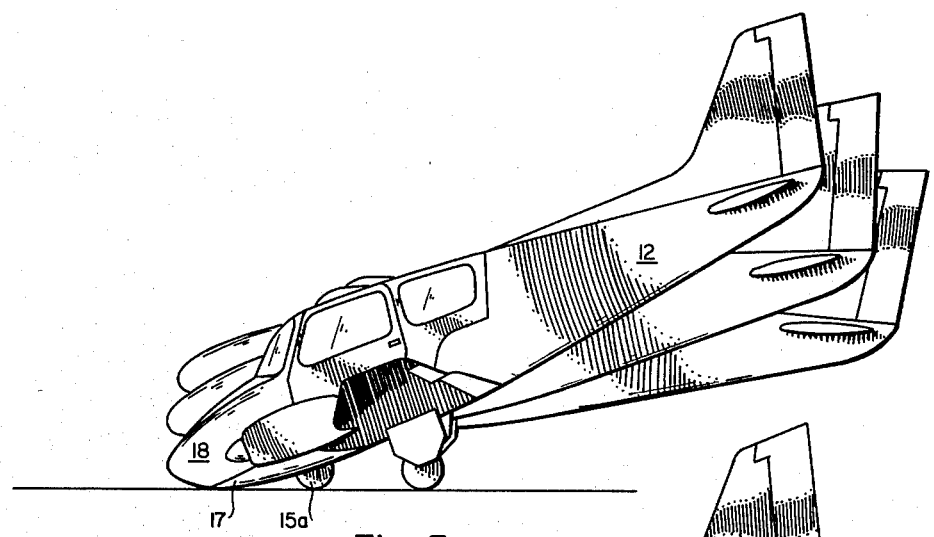
FIG. 3 is a sequential view of the land vehicle-aircraft combination showing the craft in sequential kneeling positions.

The engines 16 illustrated in FIG. 2 are typical propeller-type engines, however, jet engines could be utilized. FIG. 3 is a side elevational view of the RAAV progressively assuming a kneeling position. It is in this kneeling position that the land vehicle is disengaged and re-engaged to the aircraft. A nose wheel 15a may be slowly retracted to permit the nose platform 17 of the aircraft to come to a final resting position upon the ground.

Figure 4:
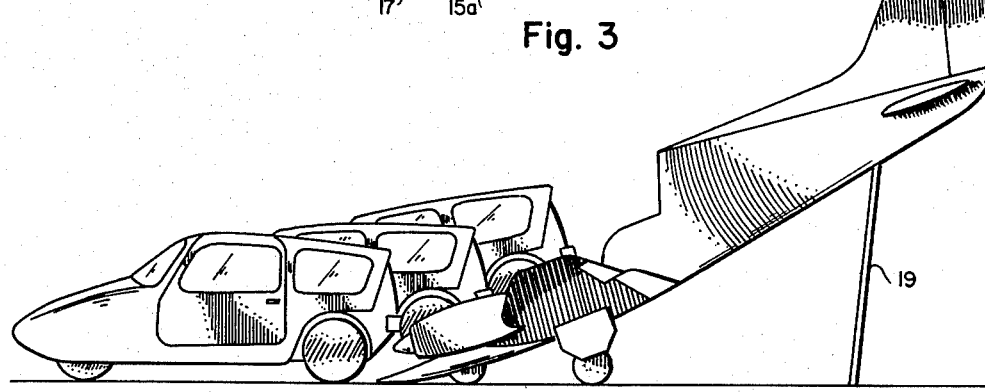
FIG. 4 is an elevational view in sequential fashion showing the separation of the land vehicle from the aircraft.

The land vehicle, as illustrated in FIG. 4, is started and driven off the ramp. A hinged leg or strut 19 is hinged longitudinally near the end of the fuselage. The strut may be dropped into position after the plane has assumed its maximum kneeling position. The leg 19 maintains the aircraft in a kneeling position after the land vehicle has been driven off. Because of the forward positions of the twin engines a strut or leg 19 may not be needed.

Figure 5:
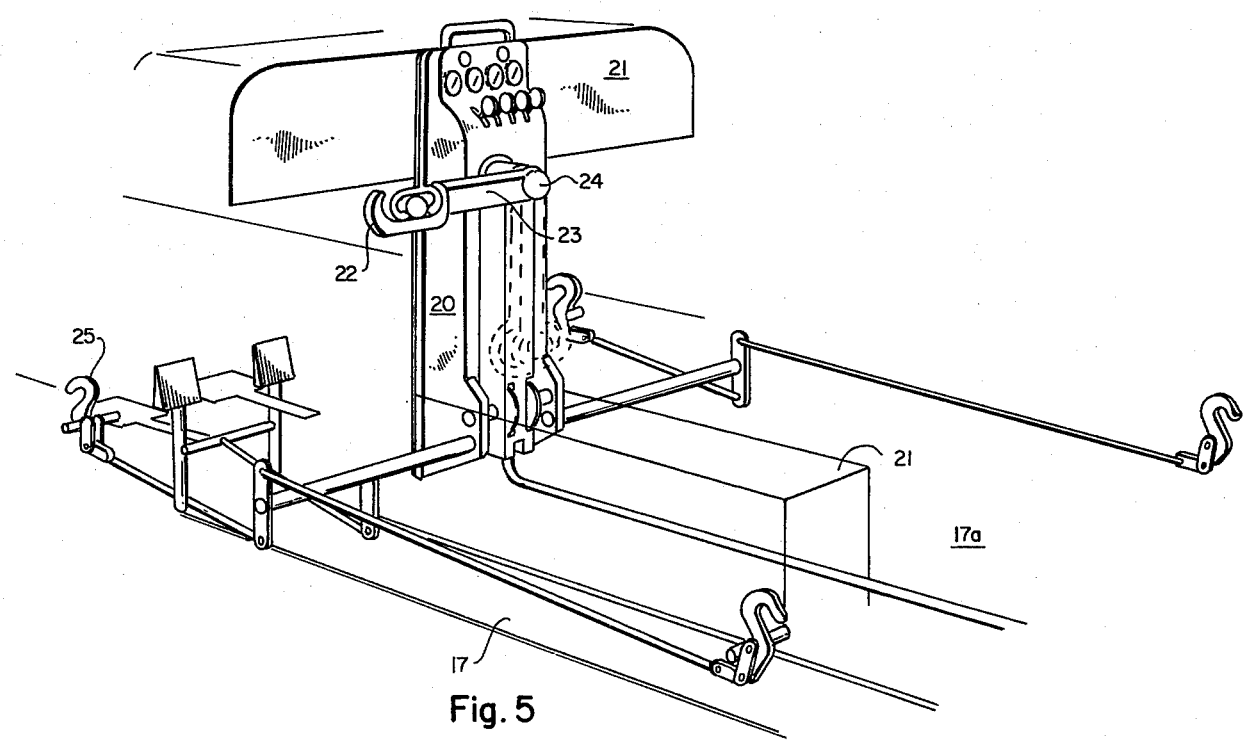
FIG. 5 is a perspective view of the aircraft nose platform which supports the land vehicle, illustrating the aircraft control stalk.

FIG. 5 illustrates the controls of the aircraft mounted upon a single folding stalk which may be locked onto the dashboard 21 of the land vehicle. The control stalk 20 is mounted on the upper surface 17a of the nose platform 17. A control stalk 20 folds into a recess 20a in the upper surface of the platform so that in a folded position the control stalk has its back substantially flush with the top side of the nose platform. Preferably it will be flush, sealed against weather and lockable. The steering wheel of the aircraft 22 and its support stem 23 rotate about an axle 24 so that the wheel stem 23 and wheel 22 may be rotated 90° to a dependent position so that as the control stalk is folded into the nose platform, the wheel and support 23 are longitudinally aligned with the control stalk.

The nose platform 17, as illustrated in FIG. 5 also shows the locking mechanism which consists of four hooks 25 which hook over pins attached to the land vehicle to securely lock the land vehicle to the nose platform. The locking hooks 25 are actuated by the movement of the control stalk from a horizontal to an upright position. Thus, when the control stalk 20 is locked to the dashboard 21 of the vehicle, the vehicle is securely and immovably locked by the hooks 25 to the nose platform.

The structure and function of the control stalk is a particularly unique and advantageous aspect of the instant invention. The control stalk is attached securely to an axle whose length approaches the width of the nose platform. The axle is journaled at each end and forms the axis about which the control stalk rotates as it is moved to an upright position.

Through various linkages, rotation of the axle also locks the land vehicle securely to the nose platform and raises the rudder pedals through an opening in the floorboard of the land vehicle. Thus, once the control stalk is in an upright position, the rudder pedals are in position and the aircraft operator has assurance that the land vehicle and the aircraft are securely fastened together. As indicated herein, the back of the control stalk preferably has an electrical plug which mates with a receptacle on the dashboard of the land vehicle to provide an interconnection between the respective electrical systems. The control stalk may also be equipped with a manual lock which latches the control stalk in an upright position so that it can't be accidentally lowered. An electrical lock may also be provided so that the control stalk cannot be lowered so long as the planes' engines are operating.

Figure 6:
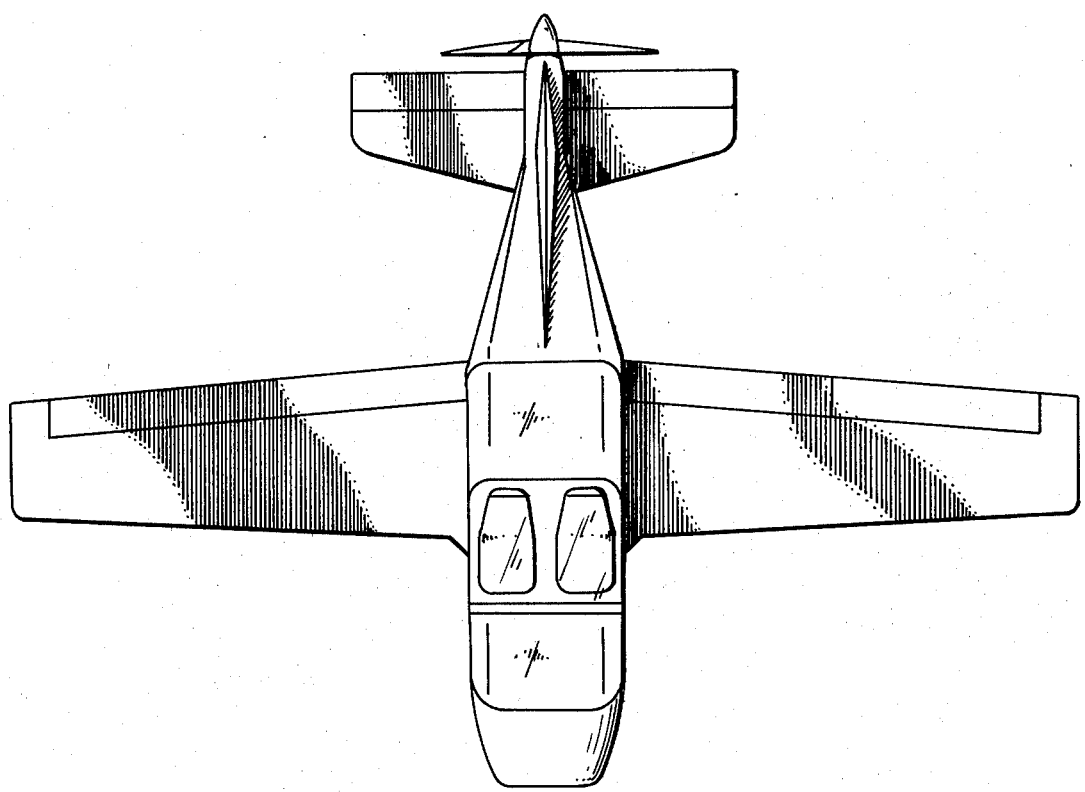
FIG. 6 is a plan view of a pusher-prop aircraft-land vehicle combination.
Figure 7:
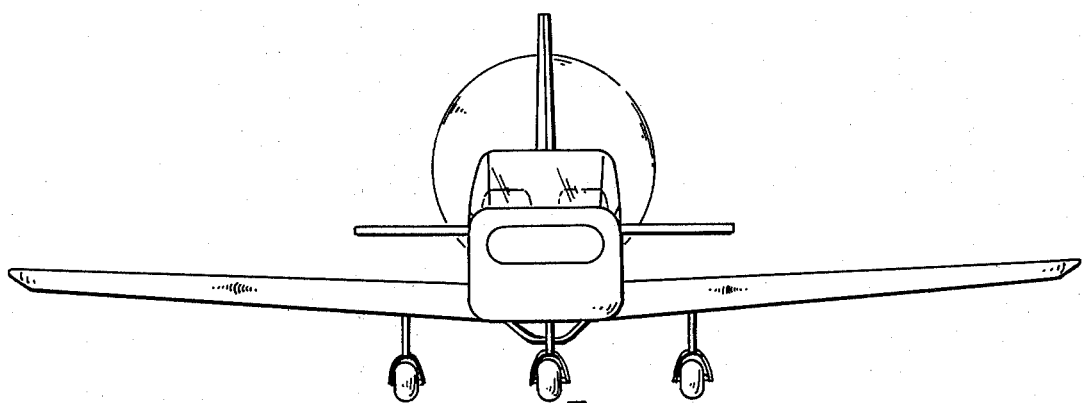
FIG. 7 is a frontal elevational view of the craft of FIG. 6.
Figure 8:
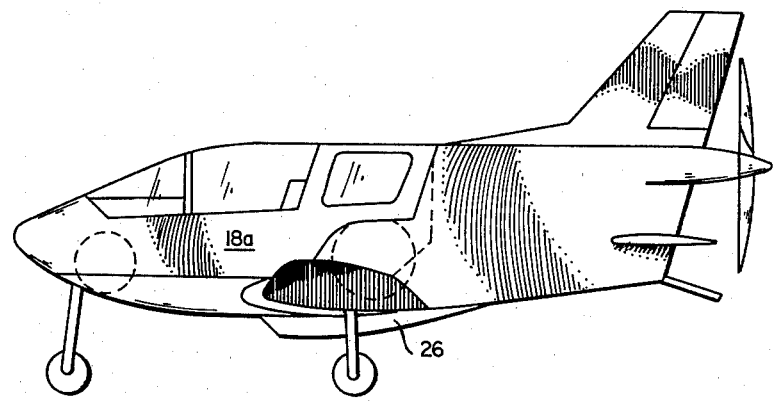
FIG. 8 is an elevational side view of the craft of FIG. 6.

FIGS. 6, 7 and 8 illustrate a variation upon the RAAV illustrated in the previous drawings. The RAAV of FIGS. 6, 7 and 8 is a single, pusher prop aircraft. The engine of this aircraft is located near the rear of the land vehicle 18a wherein the aircraft engine has an air scoop 26 which introduces air to the rear mounted aircraft engine. The position of the wheels of the land vehicle is illustrated in the dotted lines. The engine of the land vehicle 18a is preferably located in the front of the vehicle in this embodiment in order to provide in-flight balance for the RAAV.

The wing location on the RAAV of FIGS. 6, 7 and 8 may be slightly more to the rear than the wing location of the RAAV of FIG. 1 inasmuch as the aircraft engine weight may tend to move the center of gravity more to the rear of the craft, necessitating a more rearward location of the aircraft wings. Wing location will depend upon center of gravity of the RAAV. Center of gravity will depend upon location and weight of major components, such as the engines. The rear location of the engine of the RAAV of FIGS. 6, 7 and 8 will require a rear located folding stanchion of the type illustrated in FIG. 4 when the plane is in a forward kneeling position.

Figure 9:
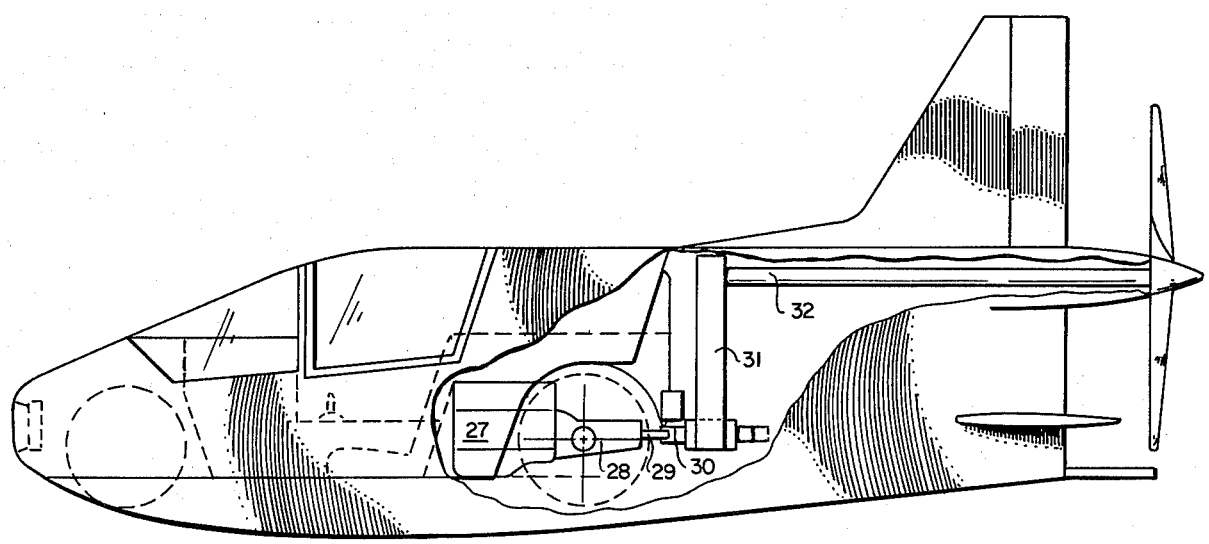
FIG. 9 is an elevational view of the shared engine.

The combination craft (RAAV) illustrated in FIG. 9 is similar to the RAAV of FIGS. 6, 7 and 8 except that it has a shared engine which is located near the rear of the land vehicle. The engine 27 drives the rear wheels of the land vehicle through a transmission 28. The driveshaft 29 of the engine extends beyond the rear of the land vehicle to engage a socket 30 permanently located in the aircraft portion of the RAAV. A vertical transmission 31 transmits the rotational force of driveshaft 30 to the prop shaft 32 at a different level.

Since the wheels of the land vehicle drop into recesses in the nose platform, the alignment of the driveshaft 29 with the socket 30 is assured.

A combination road and air vehicle (RAAV) is a very desirable and convenient means of transportation especially for those flying into smaller airports where the ground or other transportation is not readily available. Also, these RAAVs are very useful for flying into remote areas whereby the land vehicle may be detached from the plane to inspect surrounding countryside, such as may exist near potential oil wells, construction sites and the like.

The RAAV of the instant invention is particularly useful inasmuch as the land vehicle may be readily detached and retrieved. A minimum of effort is required and can be accomplished by a single pilot/driver from the cockpit of the RAAV. Upon landing and stopping, the RAAV may have its nose wheel slowly retracted to assume a kneeling position. The engine of the land vehicle is started, the plane control stalk and the locking hooks are disengaged and the control stalk is secured in the nose platform. The land vehicle is then driven off the nose platform. The land vehicle is retrieved by reversing these procedures.

The RAAV of this invention is further useful in that the car does not have to be specially reinforced. The under-carriage of the land vehicle, which supports the land vehicle, is generally stronger than the upper body and may have a strong pin means to which the locking hooks engage to lock the land vehicle to the aircraft. The aircraft and the land vehicle each have separate support wheels. Thus, the aircraft is self-supporting when the land vehicle is remote from it. The land vehicle and the aircraft each have separate electrical and hydraulic systems, although certain components such as battery and generator may be shared.

Once the land vehicle has its tires resting in the recesses in the nose platform, the steering wheel of the land vehicle telescopes forward raising the forward portion of the floorboard (driver's side) along with auto foot peddles up under the auto dashboard. The control stalk may then be raised and locked in position. This raises the rudder pedals through the floorboard into the same relative position as the auto pedals occupied previously. The steering wheel of the plane may then be rotated into position, which would be to the rear of the steering wheel of the land vehicle.

The control stalk contains the aircraft engine controls—throttle, air mixture and the like—and various other controls such as flaps, trim tabs and the like. Aircraft fuel, oil pressure, engine temperature and other aircraft engine indicators are also located on the control stalk. Other indicators such as air velocity, altimeter, climb and bank indicators and the like are preferably located on the land vehicle's dashboard. Radio transmitters and receivers are likewise installed in the land vehicle.

The power plant for the land vehicle may be a separate or shared internal combustion engine. Each approach has advantages. A RAAV having separate power plants for the aircraft and land vehicle can have aircraft engines designed strictly for flight and maintained etc. in accordance with aircraft regulations. There would be no concern about "gunking up" an aircraft engine by stop-and-go city traffic. Also, a very small engine could be used for the land vehicle power plant.

There are advantages, however, for a shared engine design, especially for small aircraft and, in particular, for the home-constructed craft. One advantage is that there is no additional weight to be airborne. Secondly, a single, shared engine is a more economical structure. A simple, shared engine permits all engine controls to be an integral part of the land vehicle, thus simplifying the structure of the folding control stalk.

In a dual-power plant RAAV, the land vehicle may be powered by one or more battery-driven motors. Even lead-acid batteries of conventional design could be used. The lead-acid batteries would probably weigh about the same as a small internal combustion engine, but it would permit only aviation fuel to be carried and at a location remote from the cockpit. Advanced batteries such as the zinc-chlorine and sodium sulfur batteries could power the land vehicle very adequately while saving considerable weight in comparison to an internal combustion engine. Also, the batteries need not be clustered all in one location; they may be positioned to save space and to accommodate the proper location of the center of gravity of the RAAV.

The combination craft described and claimed herein has a number of notable characteristics, such as:

(1) Aerodynamics—which, unlike many prior art combination craft, are as good as most lightweight aircraft.

(2) Balance—is locating the center of gravity of the craft to have conventional flight characteristics.

(3) Reliability—has been optimized by minimizing the number of interlocks which must occur between land vehicle and aircraft.

(4) Simplicity—of the joining and disjoining of the two craft; the self-supporting nature of the aircraft when disjoined from the land vehicle.

The speculation of the aircraft landing gear is a further unique aspect of this RAAV. The aircraft landing gear may be retracted so that no unnecessary airflow impediment exists. The nose wheel may be slowly retracted, apart from the other land gear, to cause the plane to kneel, nose down. The land vehicle wheels thus function solely for the purpose of carrying, guiding and propelling the land vehicle. While some slight weight increase may accompany this wheel specialization structure, the reliability and less complicated design compensate for any added weight.

I claim:

1. Combination road and air vehicle comprising:
   an airframe with fuselage, wings and tail elements;
   flight propulsion means attached to said airframe;
   a nose platform extending forward from the bottom of said fuselage, said platform adapted to receive and support a small self-propelled land vehicle;
   tricycle landing gear attached to said airframe with the nose wheel attached by a folding strut to the underside of said platform;
   aircraft control means on a folding stalk foldably attached to the top side of said platform;
   land vehicle having a power plant and wheels, said vehicle having a central longitudinal opening in its bottom surface sized to allow said folding stalk to be raised into the vehicle compartment from the top side of said platform;
   locking means on said platform to lock said vehicle to said platform.

2. The road and air vehicle of claim 1 wherein said wings are attached to the lower part of the airframe.

3. The road and air vehicle of claim 1 wherein said land vehicle has a rear engine power plant.

4. The road and air vehicle of claim 1 wherein said land vehicle has four wheels.

5. The road and air vehicle of claim 1 wherein said land vehicle has a battery, lights and controls independent of said airframe.

6. The road and air vehicle of claim 1 wherein said airframe has a battery, lights, hydraulic system, electrical system and controls independent of said land vehicle.

7. The road and air vehicle of claim 1 wherein said land vehicle has compartment pressurization means.

8. The road and air vehicle of claim 1 wherein said land vehicle has dashboard interlock means to lock said control stalk in a substantially upright position within said vehicle compartment.

9. The road and air vehicle of claim 1 wherein pressure seal means provides a seal between the bottom of said land vehicle and the upper surface of said platform.

10. The road and air vehicle of claim 1 wherein said vehicle length is proportioned to said airframe such that the rear of said vehicle is substantially adjacent (or near) the trailing edge of the wings adjacent the airframe fuselage when said land vehicle is locked to said platform.

11. The road and air vehicle of claim 1 wherein the height of said land vehicle is proportioned to said airframe such that the roof of said land vehicle forms a substantially smooth, continuous surface with the upper surface of the fuselage of said airframe when said vehicle is locked to said platform.

12. The road and air vehicle of claim 1 wherein said airframe has a monocoque fuselage.

13. The road and air vehicle of claim 1 wherein the upper surface of said nose platform is substantially adjacent the upper surface of said wings where said wings attach to said airframe fuselage.

* * * * *